United States Patent [19]

Furusawa et al.

[11] Patent Number: 4,505,540
[45] Date of Patent: Mar. 19, 1985

[54] SPLICED PORTION HOUSING STRUCTURE FOR OPTICAL FIBER IN OPTICAL SUBMERGED REPEATER

[75] Inventors: Kahei Furusawa, Kamifukuoka; Makoto Nunokawa, Kawasaki; Yoshihiro Ejiri, Tokyo; Hitoshi Yamamoto, Yamato; Yoshihiko Yamazaki, Yokohama; Koichi Tatekura, Hiratsuka, all of Japan

[73] Assignee: Kokusai Denshin Denwa Kabushiki Kaisha, Tokyo, Japan

[21] Appl. No.: 340,350

[22] Filed: Jan. 18, 1982

[30] Foreign Application Priority Data

Jan. 20, 1981 [JP] Japan .................... 56-5897

[51] Int. Cl.³ .......................... G02B 5/14; G02B 7/26
[52] U.S. Cl. ............................ 350/96.20; 350/96.10; 350/96.21; 174/70 S; 174/70 R
[58] Field of Search .............. 350/96.22, 96.21, 96.20, 350/96.10; 174/70 R, 70 S

[56] References Cited

U.S. PATENT DOCUMENTS

| 2,914,599 | 11/1959 | Clarke et al. | 174/70 S |
| 3,082,291 | 3/1963 | Parkinson et al. | 174/70 S |
| 3,201,508 | 8/1965 | Katzschner | 174/70 S |
| 3,270,312 | 3/1964 | Olsen | 174/70 S |
| 3,349,163 | 10/1967 | Rocton | 174/70 S |
| 4,029,894 | 6/1977 | Jarvis et al. | 174/70 S |
| 4,172,212 | 10/1979 | Heinzer | 350/96.21 |
| 4,295,707 | 10/1979 | Nakai et al. | 350/96.2 |
| 4,422,718 | 12/1983 | Nakagome et al. | 350/96.23 |

FOREIGN PATENT DOCUMENTS 54-55453 2/1979 Japan .................... 350/96.2

Primary Examiner—William L. Sikes
Assistant Examiner—Brian M. Healy
Attorney, Agent, or Firm—Robert E. Burns; Emmanuel J. Lobato; Bruce L. Adams

[57] ABSTRACT

A spliced portion housing structure for an optical fiber in an optical submerged repeater, characterized in that, in order to splice together in a joint ring an optical fiber and a power-supplying feeder from the optical submerged repeater to an optical fiber and a power-supplying feeder of a tail cable from a cable coupling of an optical submarine cable, respectively, a joint chamber is provided on an end plate of a housing of the optical submerged repeater in such a manner that the end plate forms a part of the joint chamber; the optical fiber and the power-supplying feeder from the submerged repeater are introduced into the joint chamber through a first feedthrough provided in the end plate for hermetically introducing the optical fiber and the power-supplying feeder; the tail cable from the cable coupling is hermetically introduced into the joint chamber through a second feedthrough provided in the wall of the joint chamber so that the tail cable is insulated from the joint chamber, the optical fibers and the feeders pulled into the joint chamber from both of the first and second feedthroughs are respectively spliced together while being isolated from each other and housed in the joint chamber; the optical fiber spliced portion is fixed to a cage mounted in the joint chamber; and the joint chamber is formed to have a water pressure resisting and airtight structure.

8 Claims, 5 Drawing Figures

SPLICED PORTION HOUSING STRUCTURE FOR OPTICAL FIBER IN OPTICAL SUBMERGED REPEATER

BACKGROUND OF THE INVENTION

The present invention relates to splicing signal paths and power-supplying feeders of an optical submarine cable and an optical submerged repeater in an optical submarine cable system which employs, as a transmission medium, an optical fiber formed principally of quartz.

A signal path in the optical submarine cable system is constituted by an optical fiber, which is formed principally of quartz and hence is fragile and readily broken. In addition, its mechanical strength is apt to be degraded under circumstances of much moisture. Therefore, in a case the optical fiber issued as a submarine cable, it is of importance to protect the optical fiber from the seawater pressure and to hold back the seawater; such steps are taken for the optical submarine cable.

In the interconnecting of such tail cables, each having the optical fiber and the power-supplying feeder formed as a unitary structure, it is extremely difficult to install an extra length of optical fiber in a state of safety unless it is very short. For optical fiber splicing are employed connector splicing, V-groove butt splicing and fusion splicing methods but, in an optical submarine cable system, fusion splicing is the most excellent in terms of splice loss and longterm reliability. In a case of use of a fusion splicing method, it is necessary that a plurality of single-mode optical fibers be spliced together for use in the optical submarine cable be given an extra length of 30 cm or so at maximum even if the splicing skill level of the fabricator is taken into account. The reason for this is that in the case of the single-mode optical fiber, if satisfactory optical and mechanical characteristics cannot be obtained by one splicing operation, the optical fiber is made shorter by a repetition of the splicing operations. It is expected that dispersion in the length of the fibers after splicing will be reduced by improvements in a splicing jig and devices in the future, but it is necessary to consider that some dispersion will be left unless the entire splicing operation is fully automated. Further, the optical fiber spliced portion is mechanically weak, and hence it must be protected from an external force and it is necessary to secure the long-term reliability of the spliced portion even after it is installed in an extra-length housing portion. Moreover, considering works on the cable ship, it is desirable that the spliced portion housing structure and assembling structure be simple as much as possible.

BRIEF SUMMARY OF THE INVENTION

It is an object of the present invention to provide a spliced portion housing structure for an optical fiber and power-supplying feeder in an optical submerged repeater which is excellent in operation and high in reliability by providing an optical fiber spliced portion housing chamber, that is, a joint chamber on an end plate of the repeater housing and by installing the spliced portion and an extra length of the optical fiber in the chamber so as to solve the abovesaid problems.

In accordance with the present invention, there is provided a spliced portion housing structure for an optical fiber in an optical submerged repeater, characterized in that, in order to splice together in a joint ring an optical fiber and a power-supplying feeder from the optical submerged repeater to an optical fiber and a power-supplying feeder of a tail cable from a cable coupling of an optical submarine cable, respectively, a joint chamber is provided on an end plate of a housing of the optical submerged repeater in such a manner that the end plate forms a part of the joint chamber; the optical fiber and the power-supplying feeder from the submerged repeater are introduced into the joint chamber through a first feedthrough provided in the end plate for hermetically introducing the optical fiber and the power-supplying feeder; the tail cable from the cable coupling is hermetically introduced into the joint chamber through a second feedthrough provided in the end wall of the joint chamber so that the tail cable is insulated from the joint chamber, the optical fibers and the power-supplying feeders pulled into the joint chamber from both of the first and second feedthroughs are respectively spliced together while being isolated from each other and housed in the joint chamber; the optical fiber spliced portion is fixed to a cage mounted in the joint chamber; and the joint chamber is formed to have a water pressure resisting and airtight structure.

BRIEF DESCRIPTION OF THE DRAWINGS

The present invention will be hereinafter described in detail with reference to the accompanying drawings, in which.

DETAILED DESCRIPTION

The construction of an optical submarine cable and the construction of an optical submerged repeater, to which the present invention is discussed, will first be applied.

Figure 1:
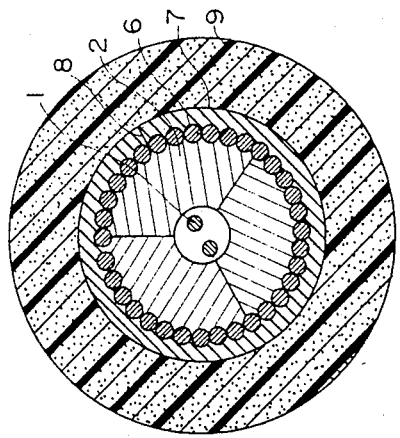
FIG. 1 is a cross-sectional view showing an example of the construction of an optical submarine cable to be spliced by the present invention.

FIG. 1 is a diagram showing an example of the construction of an optical submarine cable disclosed in U.S. patent application No. 069,553 now abandoned. Reference numeral 1 indicates an optical fiber; 2 designates a pressure resisting structure referred to as a trisectioned pressure resisting layer; 6 identifies a tension member; 7 denotes a metal tape; 8 represents a welded portion of the metal tape; and 9 shows an insulator. The pressure resisting structure 2, the tension member 6 and the metal tape 7 protect the optical fiber 1 from the seawater pressure to hold back the seawater and to keep the optical fiber 1 free from moisture.

Figure 2:
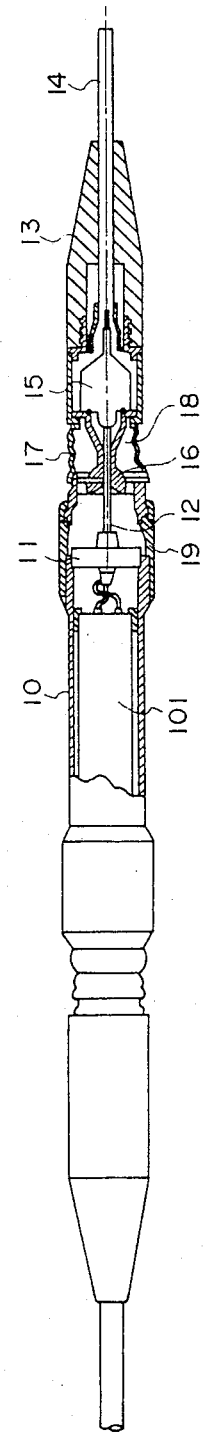
FIG. 2 is a longitudinal sectional view showing an example of a known construction of an optical submerged repeater.

FIG. 2 is a schematic diagram explanatory of an example of the construction of an optical submerged repeater of the prior art. In FIG. 2, reference numeral 101 indicates a repeater; 10 designates a pressure resisting cylinder for protecting the repeater 101 from the seawater pressure; and 11 identifies an end plate of the pressure resisting cylinder 10. An assembly of these members 101, 10 and 11 will hereinafter be generically called a repeater housing. Reference numeral 13 denotes a boot as of rubber for imparting appropriate pliability to an optical submarine cable; 15 represents an anchor cone for anchoring an optical submarine cable 14; 16 shows a universal joint; and 17 refers to a bellows which expands and contracts following the movement of the universal joint 16 to transmit pressure to a viscous material 18 sealed in the bellows itself. These members 13, 15, 16, 17 and 18 are mounted on the optical submarine cable 14 to form a unitary structure, which will hereinafter be referred to generically as a cable coupling. Reference 12 indicates an optical cable which is called a tail cable and interconnects signal paths and power-supplying feeders of the repeater housing and the cable coupling, respectively; and 19 designates a mechanical joint structure which is called a joint ring and transmits the tensile force between the repeater housing and the cable coupling. Since a pressure resisting structure is employed for the tail cable 12, the joint ring 19 has no pressure resisting structure.

Now, a description will be given of procedures for laying an optical submarine cable. In general, the aforesaid repeater housing and the optical submarine cable 14 equipped with the cable coupling are separately loaded up on a cable ship. Since the repeater housing and the cable coupling are each loaded with the tail cable 12 of a required length in advance, so that, on the cable ship, optical fibers of the both tail cables 12 are spliced together by a heat fusion method and the spliced point is covered with a pressure resisting structure such as a metal sleeve and given an external coating as of polyethylene to provide a hydraulic pressure resisting structure. Therefore, the repeater housing and the cable coupling are mechanically coupled together by means of the joint ring 19. In this case, the abovesaid tail cable 12 is housed in a coiled or like form within the joint ring 19.

Figure 3:
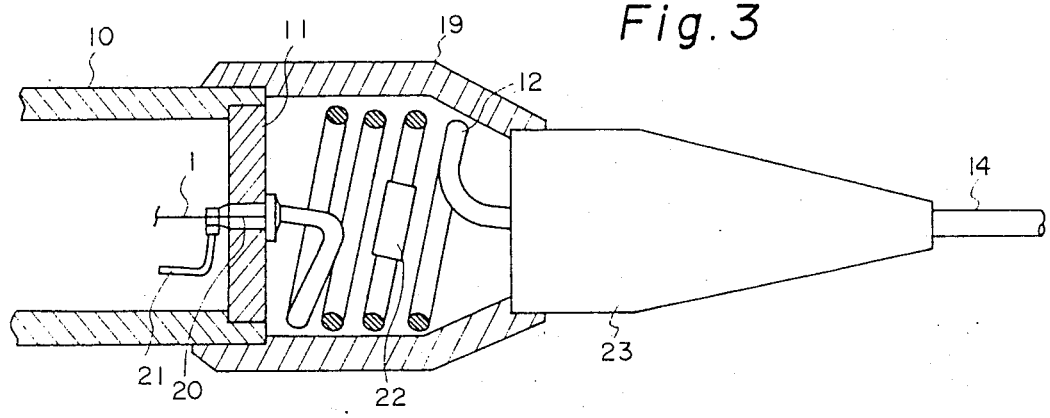
FIG. 3 is a diagram, partly in section, illustrating an example of the construction of a connecting portion of a conventional optical submerged repeater.

FIG. 3 is a diagram explanatory of the installed state of the above-mentioned tail cable. In FIG. 3, reference numeral 1 indicates an optical fiber; 21 designates a power-supplying feeder; 20 identifies a portion for airtightly introducing the optical fiber 1 and the power-supplying feeder 21; 22 denotes a tail cable spliced portion; and 23 represents a cable coupling. However, as described in detail under the above background description, it is almost impossible to satisfy the aforementioned requirements by such splicing of tail cables as shown in FIG. 3.

The present invention will hereinafter be described in detail.

Figure 4:
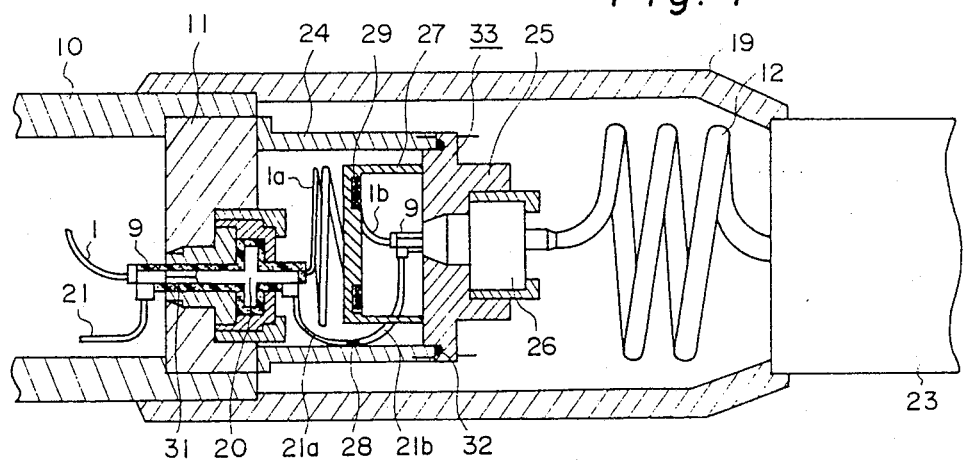
FIGS. 4 and 5 are diagrams, partly in section, each illustrating an example of the construction of a connecting portion of the optical submerged repeater according to the present invention.

FIG. 4 is a diagram illustrating an embodiment of the present invention. In the end plate 11 of the repeater housing is provided a feedthrough 20 which is an introducing portion for the optical fiber 1 and the power-supplying feeder 21. Reference numeral 31 indicates an optical fiber hermetically sealing portion, by which the atmosphere in the repeater housing is always kept clean. The end plate 11 has hermetically sealed thereto a pressure resisting cylinder 24 by welding or gasket. The feedthrough 20 and the hermetically sealed portion 31 constitute a first feedthrough for hermetically introducing an optical fiber 1a and a power-supplying feeder 21a into the repeater housing. On the other hand, the tail cable 12 extends from the cable coupling 23, and a tail cable feedthrough (a second feedthrough) is attached to the tip of the tail cable. A joint chamber end wall 25 is mounted in advance or assembled on the cable ship. The repeater housing and the cable coupling 23 are loaded on the cable ship, where they are assembled together.

The splicing operation in this case starts with splicing the optical fiber 1a from the repeater housing and an optical fiber 1b from the cable coupling, and the spliced portion 29 is fixed to a spliced portion fixing cage 27, which is attached to the pressure resisting end wall 25. Next, the power-supplying feeders 21a and 21b are spliced together as indicated by reference numeral 28. Then, the pressure resisting cylinder 24 of the repeater housing and the pressure resisting end wall 25 of the cable coupling are assembled together by hermetic sealing through the use of a gasket or the like 32. The pressure resisting cylinder 24 and the pressure resisting end wall 25 form a joint chamber 33. Finally, the cylinder 10 of the repeater housing and the cable coupling 23 are mechanically coupled together by the joint ring 19.

With such a structure, even if dispersion in the extra length of the optical fibers is several tens of centimeters, it can easily be accommodated in the joint chamber 33 because the space therein can be effectively utilized. Further, since the spliced portion 29 can be fixed to the cage 27, it is kept free from bending, stretching or like external forces, providing for enhanced reliability. Moreover, this optical cable splicing structure can be simply achieved, from the view point of workings on a cable ship, only by splicing respectively the optical fibers and the power-supplying feeders and hermetically fixing the end wall 25 to the pressure resisting cylinder 24 without involving insulator molding which thermally affects the optical fibers and takes much time; therefore, this structure is very excellent in operation. It is also possible that the tail cable feedthrough 26 of the joint chamber hermetically seals both of the optical fiber and the power-supplying feeder or only the power-supplying feeder of the tail cable 12. In this case, the tail cable feedthrough 26 becomes identical in construction with the end plate feedthrough 20 except that the optical fiber sealing portion 31 of the latter is removed, and the atmosphere in the joint chamber 33 is the same as in the pressure resisting layers of the submarine cable and the tail cable. The reason for this is that the feedthrough 20 guaranteed high reliability is provided in the repeater housing end plate, and that even if seawater enters into the pressure resisting layer while in trouble, it can be prevented by the feedthrough 20 from further entering into the repeater housing. In addition, by filling the joint chamber 33 with polyisobutylene or like viscous material of good wettability, it is possible to prevent seawater from exerting influence on the interior of the joint chamber 33 while in trouble and since a new protective coating can be applied to the spliced portion of the optical fibers after being stripped, seawater can be prevented by the protective coating from further entering into the optical fiber coating. Accordingly, in a case of repair, the optical fiber 1a in the feedthrough 20 is kept free from the influence of seawater and hence it is reusable and, by splicing it to a new optical fiber 1b, a transmission of the same reliability as before trouble can be maintained. This repair operation, in the case of replacing the entire malfunctioning section by a new part, can also be achieved only by preparing a new tail cable feedthrough 26 or a new end wall 25 of the joint chamber 33 and by performing exactly the same operation as the aforesaid splicing operation. Therefore, the structure of the present invention is also excellent from the viewpoint of repair.

Figure 5:
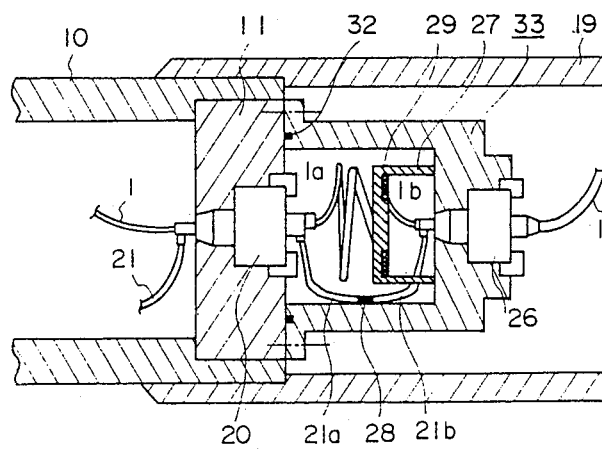

The pressure resisting cylinder 24 of the joint chamber 33 may also be formed as a unitary structure with the end plate 11 of the repeater housing. Conversely, this pressure resisting cylinder may also be formed as a unitary structure with the end plate of the joint chamber to constitute the joint chamber 33 as shown in FIG. 5. In this case, after splicing the optical fibers and the power-supplying feeders, the joint chamber 33 and the end wall 11 are hermetically fixed together by means of the gasket 32 or the like.

The present invention possesses advantages such as follows:

(1) Even if dispersion in the extra length of optical fibers as a result of its splicing is several tens of centimeters, it can be accommodated in the joint chamber.
(2) Since the spliced portion is held free from external forces, the reliability of the transmission line is retained high.
(3) The operation on the cable ship does not involve insulator molding, and hence can be done in a short time.
(4) Repairs can be effected by the same operations as those for laying the cable.

What we claim is:

1. A structure for housing a spliced portion of an optical fiber of a submarine cable connection to an optical fiber of an optical submerged repeater comprising: a submarine cable coupling member coupled to the optical fiber submarine cable for coupling said submerged repeater threreto, the submerged repeater having a pressure-resisting housing having a fluid-tight wall, a joint ring coupling between the submerged repeater housing and said submarine cable coupling member and in use in transmitting tension forces between the optical fiber submarine cable and the submerged repeater, a pressure-resisting elongated tubular member extending axially from said submerged repeater wall internally of said joint ring and having a fluid-tight end wall closing the end of the tubular member defining jointly with the tubular member and said wall of the submerged repeater a fluid-tight, hermetically sealed, pressure-resisting chamber capable of withstanding a hydraulic pressure when submerged in a deep sea or ocean, said tubular member having an axial length less than said joint ring, a tail cable extending from said submarine cable coupling member and constituting a unitary structure having at least one optical fiber therein defining a signal path and a power supply feeder, a feedthrough hermetically mounted on said end wall for providing a hermetically sealed entry of said optical fiber and said power supply feeder of said tail cable into said chamber, another feedthrough hermetically mounted on said submerged repeater wall for providing a hermetically sealed entry for at least one optical fiber and a power supply feeder from said submerged repeater into said chamber, and internally of said chamber both a splice connection between the optical fiber from said submerged repeater and the optical fiber from said first-mentioned feedthrough and another independent splice connection between the power supply feeder from said first-mentioned feedthrough and said power supply feeder from said submerged repeater, the axial length of said tubular member being sufficient to allow making all said splices internally thereof while in an open condition at one end thereof and subsequently hermetically sealing the tubular member mounted on said repeater wall, thereby defining said chamber in a closed hermetic condition.

2. A structure for housing a spliced portion of an optical fiber of a submarine cable connection to an optical fiber of an optical submerged repeater according to claim 1, in which said tail cable is a fluid-tight and pressure-resistant cable capable of withstanding hydraulic pressures when submerged in a deep sea or ocean, whereby the submerged repeater and said optical fiber submarine cable are hermetically coupled by a coupling capable of withstanding hydraulic pressures when submerged in a deep sea or ocean.

3. A structure for housing a spliced portion of an optical fiber of a submarine cable connection to an optical fiber of an optical submerged repeater according to claim 1, in which said tubular member has said end wall integral therewith.

4. A structure for housing a spliced portion of an optical fiber of a submarine cable connection to an optical fiber of an optical submerged repeater according to claim 1, including means for hermetically sealing said end wall on said tubular member.

5. A structure for housing a spliced portion of an optical fiber of a submarine cable connection to an optical fiber of an optical submerged repeater according to claim 1, in which said tubular member is integral with said wall of said submerged repeater and in which end wall closing said end of said tubular member is hermetically and releasably fixed on said tubular member, and means for hermetically sealing said end wall on said tubular member.

6. A structure for housing a spliced portion of an optical fiber of a submarine cable connection to an optical fiber of an optical submerged repeater according to claim 1, in which said tubular member has said end wall integral therewith, and in which tubular member is hermetically mounted on said wall of said submerged repeater, and means for hermetically sealing a connection between the tubular member and said wall of said submerged repeater.

7. A structure for housing a spliced portion of an optical fiber of a submarine cable connection to an optical fiber of an optical submerged repeater according to claim 1, in which said connection between the optical fibers within said chamber is a fusion connection.

8. A structure for housing a spliced portion of an optical fiber of a submarine cable connection to an optical fiber of an optical submerged repeater according to claim 1, including a cage in said chamber mounted on said end wall in which said splice connection of said optical fibers is fixed on said cage.

* * * * *